(12) United States Patent
McGoldrick

(10) Patent No.: US 6,196,606 B1
(45) Date of Patent: Mar. 6, 2001

(54) DOOR TRIM PANEL FOR A MOTOR VEHICLE

(75) Inventor: Dale L McGoldrick, Lake Orion, MI (US)

(73) Assignee: DaimlerChrysler Corporation, Auburn Hills, MI (US)

(*) Notice: Subject to any disclaimer, the term of this patent is extended or adjusted under 35 U.S.C. 154(b) by 0 days.

(21) Appl. No.: 09/545,937

(22) Filed: Apr. 10, 2000

(51) Int. Cl.[7] .................................................. B60R 7/04
(52) U.S. Cl. ........................... 296/37.13; 296/146.7; 359/549
(58) Field of Search ........................ 296/37.13, 37.12, 296/37.16, 146.7, 152; 224/273, 277, 543; 359/549

(56) References Cited

U.S. PATENT DOCUMENTS

| 1,642,161 | * | 9/1927 | Lester | 224/543 |
|---|---|---|---|---|
| 1,860,224 | * | 5/1932 | Bode | 296/37.13 X |
| 2,859,662 | | 11/1958 | Rider | 88/81 |
| 4,879,543 | | 11/1989 | Smith, Sr. | 340/473 |
| 5,009,458 | * | 4/1991 | Shute | 296/37.13 |
| 5,499,853 | * | 3/1996 | Pourian | 296/152 X |
| 5,702,144 | * | 12/1997 | Matsura et al. | 296/37.13 |
| 5,796,519 | | 8/1998 | Gold | 359/549 |
| 5,899,522 | * | 5/1999 | De Rees et al. | 296/37.13 X |
| 5,932,331 | * | 8/1999 | Jones et al. | 296/146.7 X |

FOREIGN PATENT DOCUMENTS

| 378020 | * | 8/1940 | (IT) | 296/37.13 |
| 405338499 | * | 12/1993 | (JP) | 296/37.13 |

* cited by examiner

Primary Examiner—Joseph D. Pape
(74) Attorney, Agent, or Firm—Marc Lorelli

(57) ABSTRACT

A motor vehicle inner door panel includes a map pocket having a plurality of apertures. The apertures permit partial visibility to pocket contents. A reflector assembly is secured to the inner wall of the pocket such that the reflective material is visible through at least one of the apertures.

10 Claims, 3 Drawing Sheets

ID OOR TRIM PANEL FOR A MOTOR VEHICLE

BACKGROUND OF THE INVENTION

1. Field of the Invention

The present invention generally pertains to motor vehicles. More particular, the present invention pertains to a door trim panel for a motor vehicle. More specifically, but without restriction to the particular embodiment and/or use which is shown and described for purposes of illustration, the present invention relates to a door trim panel for a motor vehicle which incorporates a map pocket with a plurality of apertures, one or more of the apertures including a reflector.

2. Discussion

Motor vehicle passenger doors commonly include a storage pocket. The storage pocket can be used by an occupant for the convenient storage of maps and other small items. Such a pocket is often referred to as a "map pocket".

Objects are introduced into a map pocket through an open upper end. The objects within the map pocket are visible through this upper end. As a result, it is often necessary to reach into the map pocket to discern the contents.

Thus a need remains in the pertinent art for a map pocket which provides improved visual access to its contents.

SUMMARY OF THE INVENTION

It is an object of the present invention to provide an inner door panel comprising of an injection molded pocket wall containing a plurality of apertures to facilitate partial view into the pocket.

It is another object of the present invention to provide a reflector for mounting on a vehicle door in such a manner that the reflector is incorporated into the vehicle door in an aesthetically pleasing manner and the reflector may be seen from the rear of the vehicle when the vehicle door is open.

It is a more particular object of the present invention to provide such a map pocket for a vehicle door including a plurality of apertures, the map pocket including a reflector mounted in at least one of the apertures.

In one form, the present invention provides an inner door trim panel for a motor vehicle. The inner door trim panel includes a main body portion and a pocket wall. The pocket wall outwardly extends from the main body portion to define a pocket. The pocket wall includes a plurality of apertures.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
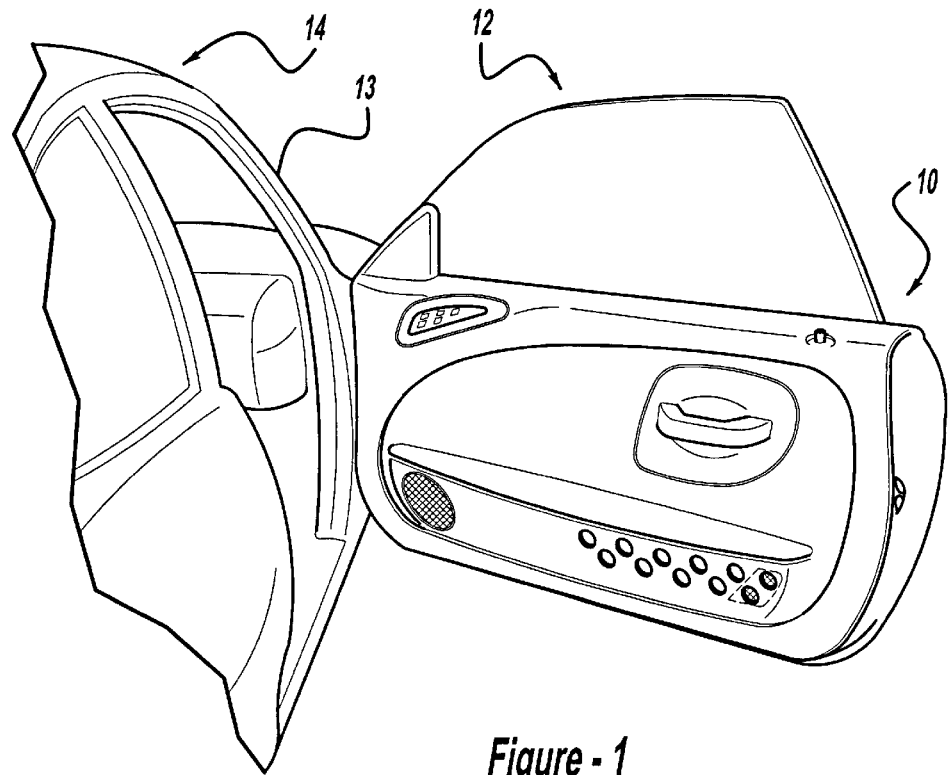
FIG. 1 is a perspective view of a motor vehicle having an inner door trim panel constructed in accordance with the teachings of a preferred embodiment of the present invention to include a map pocket having a plurality of apertures, at least one of the apertures having a reflector disposed therein.
Figure 2:
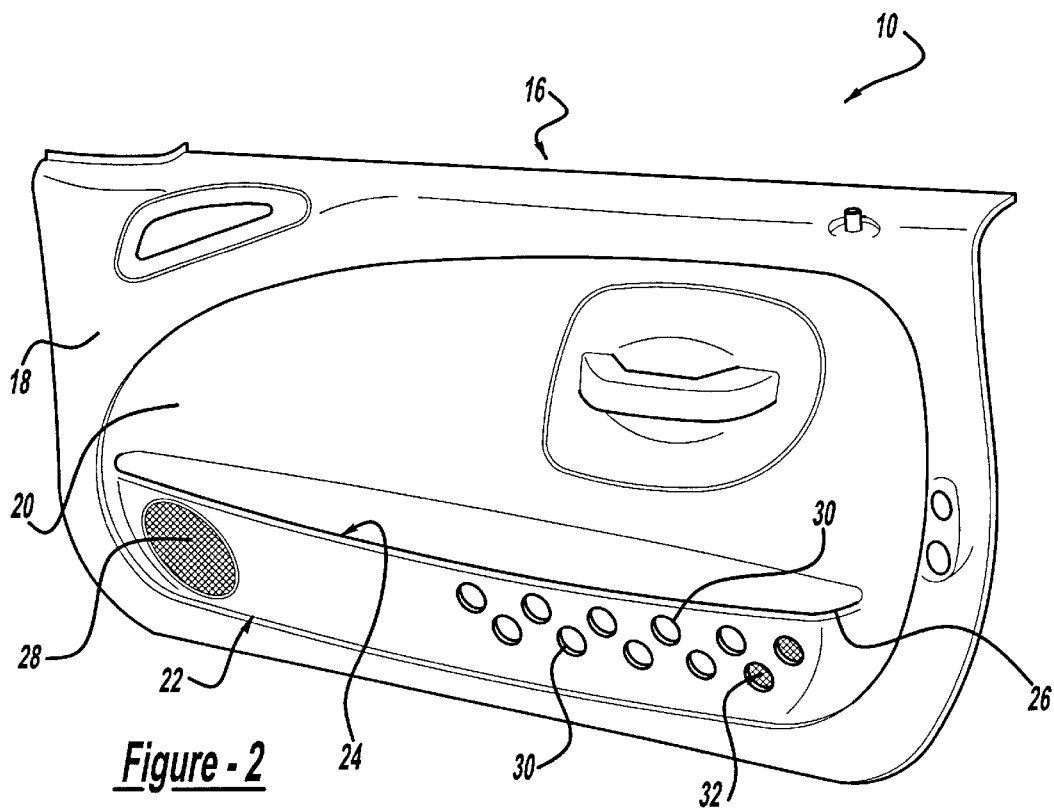
FIG. 2 is an enlarged perspective view of the inner door trim panel of FIG. 1.

With initial reference to FIG. 1, an inner door trim panel for a motor vehicle is illustrated and generally identified at reference numeral 10. The inner door trim panel 10 is shown operatively associated with a passenger door 12 which is articulably coupled in a conventional manner to a body 13 of a motor vehicle 14. It will be understood by those skilled in the art that the particular vehicle 14 shown in FIG. 1 is merely for illustrative purposes only. It will also be understood that the teachings of the present invention are not only applicable to a front passenger door, such as shown in FIG. 1, but also applicable to other passenger doors of the motor vehicle 14.

Figure 3:
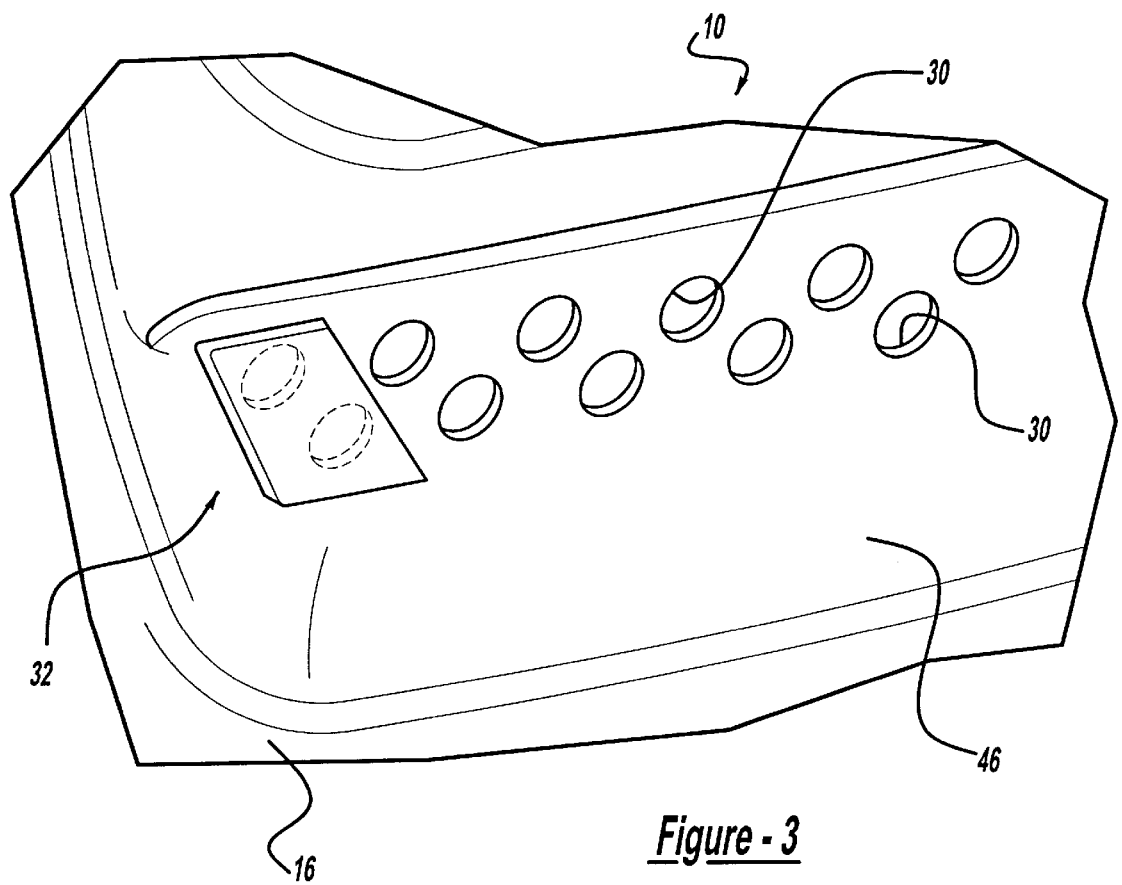
FIG. 3 is a perspective view illustrating a portion of the rear side of the map pocket.
Figure 4:
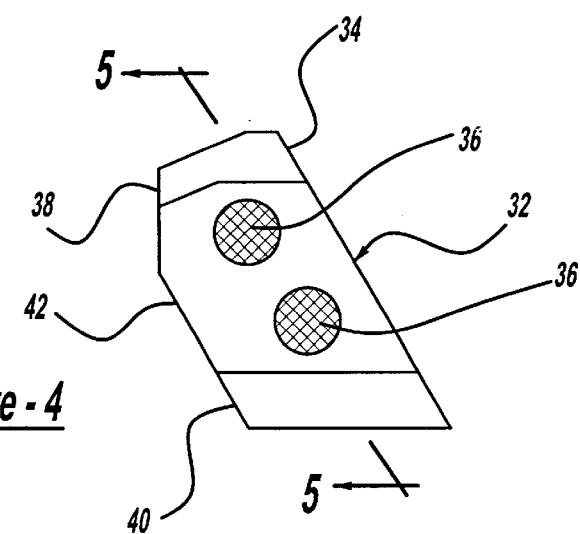
FIG. 4 is a front view of a reflector assembly of FIG. 1.
Figure 5:
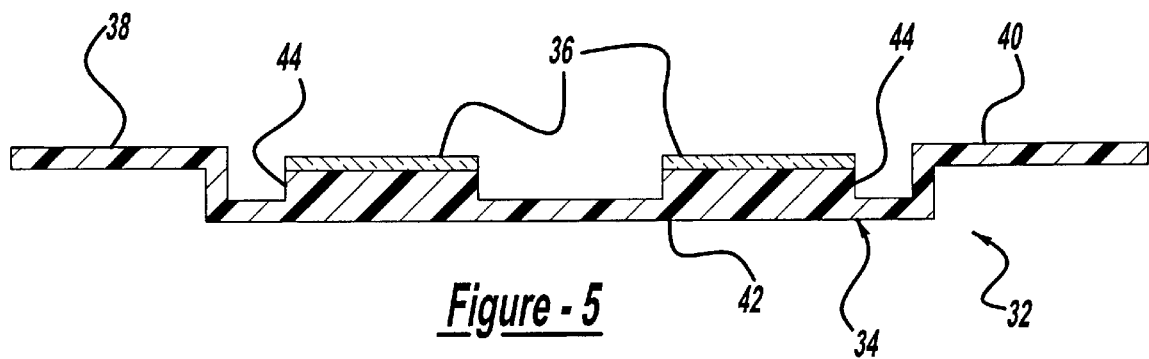
FIG. 5 is a cross-sectional view taken along the line 5—5 of FIG. 4.

With continued reference to FIG. 1 and additional reference to FIGS. 3 through 5, the inner door trim panel 10 of the present invention will be further detailed. The inner door trim panel includes a main body portion 16 which is attached to the remainder of the door 12 in a conventional manner. In the exemplary embodiment, the main body portion 16 includes a first component 18 and a second component 20. The first and second components are conventionally secured, preferably by ultrasonic welding. In one application, the first and second components 18 and 20 of the main body portion 16 are both injection molded of plastic. However, it will be appreciated by those skilled in the art that alternative materials may be employed.

The inner door trim panel 10 further includes a pocket wall 22. The pocket wall 22 outwardly extends from the main body portion 16 and defines a pocket 24. The pocket 24 has an open upper end 26 for providing access thereto. The pocket wall 22 is integrally formed to include a speaker opening 28.

The pocket wall is further shown to include a plurality of apertures 30. In the exemplary embodiment, the apertures 30 are illustrated to be generally circular in shape and arranged in first and second horizontal rows. The apertures 30 of the first and second rows are equally spaced and vertically offset. The apertures 30 provide further visual access to the contents of items placed within the pocket 24.

In the exemplary embodiment, the pocket wall 22 is shown to include eleven (11) apertures 30. It will be readily appreciated by those skilled in the art that a greater or smaller number of apertures 30 may be incorporated. In a similar regard, it will be understood that the apertures 30 may be alternatively oriented relative to one another within the scope of the present invention.

The inner door trim panel 10 of the present invention further preferably includes a reflector assembly 32 which is visible through one or more of the apertures 30 in the pocket wall 22. In the embodiment illustrated, the reflector assembly includes a substrate or main body portion 34 and at least one reflective portion 36. In one application, the reflective members 36 are specifically intended to be visible in the rearmost apertures 30 of the first and second horizontal rows. In this particular application, the main body portion 34 of the reflector assembly 32 includes a first end or upper end 38, a second end or lower end 40 and an intermediate portion 42. The first and second ends 38 and 40 are parallel to one another and generally reside within a common plane. The intermediate portion 42 is parallel to the first and second ends 38 and 40 but stepped from the first and second ends 38 and 40.

The intermediate portion 42 of the main body portion 34 is integrally formed to include a pair of generally cylindrical extensions 44. In one application, the main body portion 34 is integrally formed of a plastic material. The cylindrical extensions 44 are sized to be received within designated apertures 30 of the pocket wall 22. The reflective members 36 are adhesively or otherwise suitably secured to the cylindrical extensions 44. The first and second ends 38 and 40 of the main body portion are preferably sonic welded or otherwise suitably secured to an inner surface 46 of the pocket wall 22 by means such as adhesive or fasteners.

Figure 6:
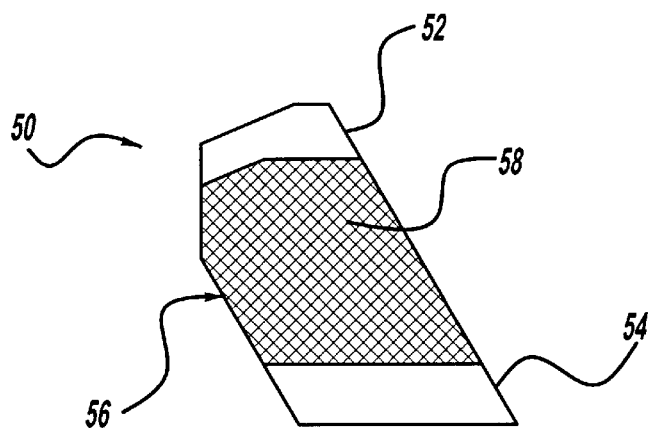
FIG. 6 is an alternative construction of a reflector assembly for use with the inner door trim panel of the present invention.

Turning now to FIG. 6, an alternative reflector assembly for use with the inner door trim panel 10 of the present invention is illustrated. Consistent with the reflector assembly 32 discussed above, the reflector assembly 50 includes a first end or upper end 52, a second end or lower end 54 and an intermediate portion 56. A front surface of the intermediate portion 56 is completely covered with a reflective material 58. As discussed above, the reflective material is adhered or otherwise secured to the remainder of the reflector assembly 50. Alternatively, it will be understood by those skilled in the art that the reflector assembly 50 may be completely constructed of a reflective material.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. An inner door trim panel for a motor vehicle, the inner door trim panel comprising:

main body portion; and a rigid pocket wall fixedly attached to said main body portion, said pocket wall extends outwardly from the main body portion to define a pocket wall defining a plurality of apertures;

wherein said plurality of apertures are generally cylindrical and wherein at least one aperture is free of obstruction so as to allow viewing through said at least one aperture.

2. The inner door trim panel of claim 1, wherein said plurality of apertures are arranged in first and second horizontal walls.

3. The inner door trim panel of claim 1, further comprising a reflector assembly having a reflective portion disposed in at least one of said apertures.

4. The inner door trim panel of claim 3, wherein said reflector assembly further includes a main body portion seared to said pocket wall, the main body portion having at least one general circular extension extending at least partially into at least one of the apertures, the reflective portion secured to the at least one circular extension.

5. The inner door trim panel of claim 4, wherein said main body portion includes a first end, a second end and an intermediate portion, said first and second ends lying substantially within a common plane, said intermediate portion being parallel to and stepped from said first and second portions, said at least one generally cylindrical extension extending from said intermediate portion.

6. The inner door trim panel of claim 5, wherein said first and second ends are attached to said pocket wall.

7. An inner door trim panel for a motor vehicle, the inner door trim panel comprising:

a main body portion;

a pocket wall outwardly extending from the main body portion, the pocket wall defining at least one aperture extending therethrough; and a reflective member disposed in the at least one aperture.

8. The inner door trim panel of claim 7, further including a reflector assembly having the reflective member, the reflective assembly further having a main body portion attached to the pocket wall.

9. The inner door trim panel of claim 8, wherein the main body portion includes a circular extension, the reflective member secured to the circular extension.

10. The inner door trim panel of claim 9, wherein said main body portion includes a first end, a second end and an intermediate portion, said first and second ends lying substantially within a common plane, said intermediate portion being parallel to and stepped from said first and second portions, said at least one generally cylindrical extension extending from said intermediate portion.

* * * * *